Sept. 13, 1960
J. A. LINDSAY
2,952,029
WINDSHIELD WIPER
Filed Jan. 19, 1953
2 Sheets-Sheet 1
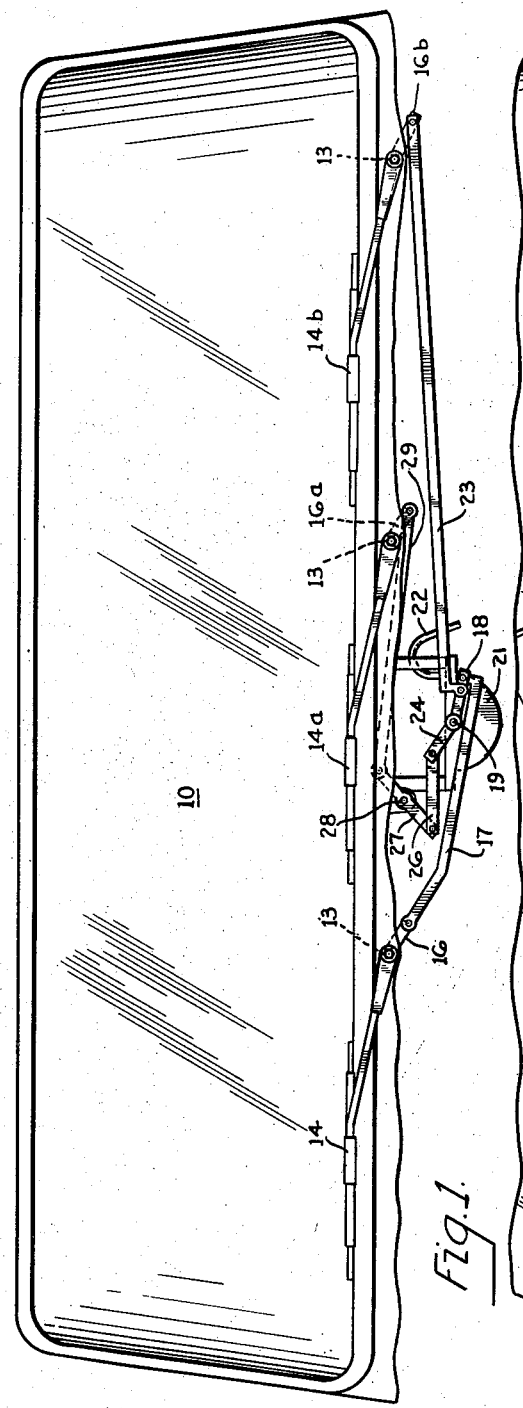
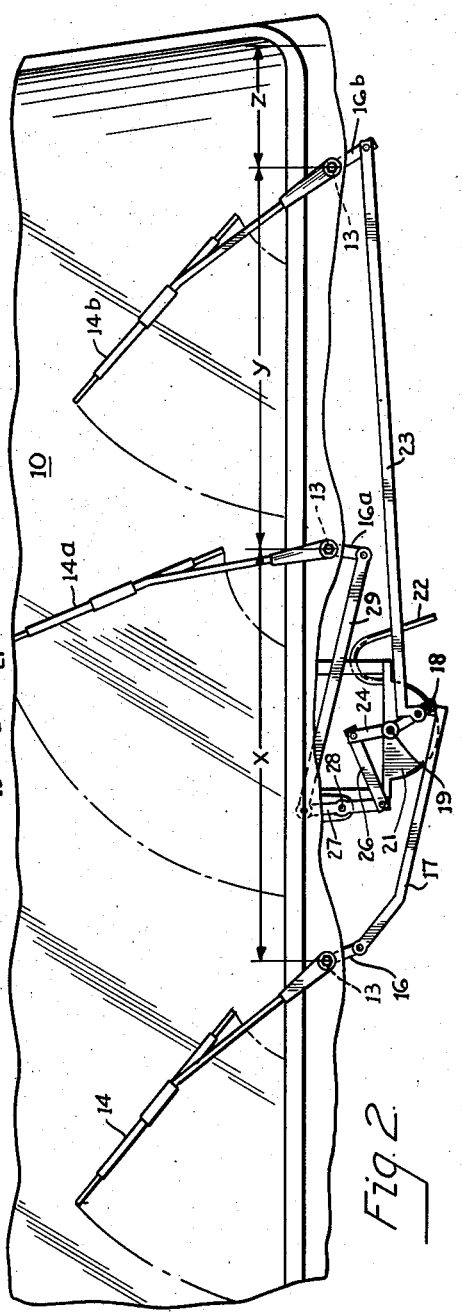
INVENTOR.
John A. Lindsay,
BY C. E. Tripp
his ATTORNEY.

Sept. 13, 1960
J. A. LINDSAY
2,952,029
WINDSHIELD WIPER
Filed Jan. 19, 1953
2 Sheets-Sheet 2
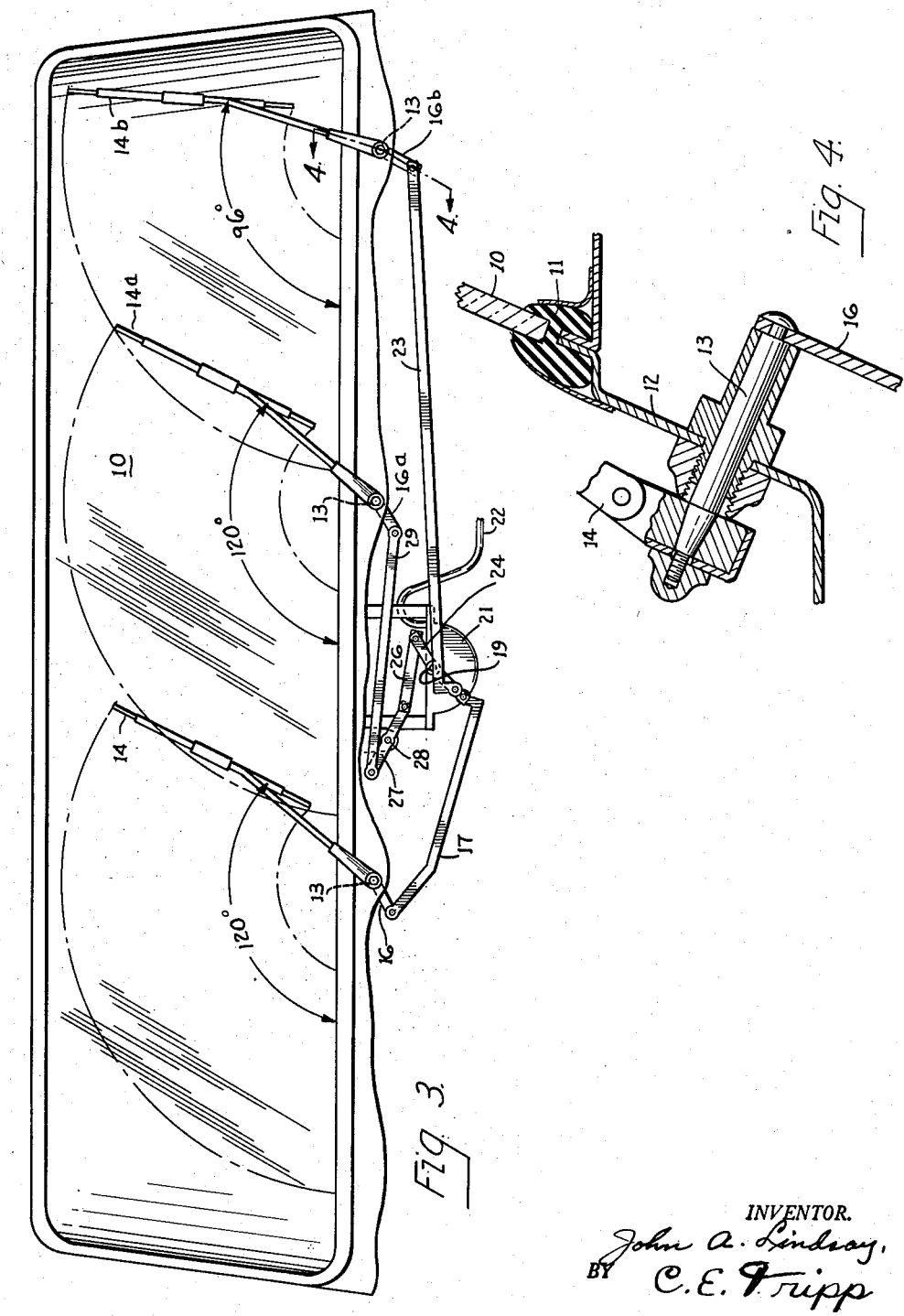
INVENTOR.
John A. Lindsay,
BY C. E. Tripp
his ATTORNEY.

United States Patent Office 2,952,029
Patented Sept. 13, 1960

2,952,029
WINDSHIELD WIPER

John A. Lindsay, 3219 W. Ridgewood Drive, Parma, Ohio

Filed Jan. 19, 1953, Ser. No. 331,805

1 Claim. (Cl. 15—250.27)

This invention relates to windshield wipers for vehicles. The trend in car design has been toward relatively wide windshields, the result being that the conventional two-blade wiper assembly leaves objectionable blind spots. I have found that by providing three wiper blades, and by driving them so that their arcs of travel are substantially less than 180°, I can actually eliminate all blind spots, and such is the object of my invention.

The manner in which the aforesaid object may be accomplished will be apparent from the following detailed description of a preferred embodiment of the invention.

In the drawings:

Fig. 1 shows the assembly in the retracted position;
Fig. 2 illustrates an intermediate position;
Fig. 3 shows the advanced position, and
Fig. 4 is a section taken on the line 4—4 of Fig. 3.

As seen in Fig. 4, the windshield 10 is mounted in an extended rubber strip 11 that is attached to the body above a short vertical cowl 12. Three shafts 13 are rotatably mounted in the cowl 12 by means well known in the art, a typical construction appearing in Fig. 4 and forming no part of this invention.

In accordance with this invention, three blade mountings are provided for the blades 14, 14a, and 14b as seen in Figs. 1 to 3. The shafts 13 that oscillate these blades are each keyed or riveted to a crank 16, 16a, and 16b, respectively. Crank 16 is pinned to a link 17, the other end of link 17 being pinned to a crank 18 driven by shaft 19 of a motor 21. Motor 21 is of the usual type wherein a vane is oscillated under control of a self-actuating valve connected to a source of air under less than atmospheric pressure by line 22.

In carrying out my invention, I drive blade 14b by a link 23 connected between motor crank 18 and blade crank 16b, but it will be noted that the point of attachment of link 23 to motor crank 18 is closer to motor shaft 19 than is the point of attachment of link 17. These distances are selected with regard to the mounting positions of blades 14 and 14b. It will be noted that I prefer to impart a smaller angular motion to blade 14b (directly in front of the driver) than to the other blades. This feature eliminates blind spots at the upper left zone of the windshield, as it is viewed by the driver.

It will also be noted that with the linkage of my invention, blades 14 and 14a traverse an arc of 120° instead of the usual arc of about 180°. The smaller arc here is made possible by the overlap effect shown in Fig. 3. Thus, not only are blind spots eliminated, but the arc of blade travel is reduced by at least 33%, thereby reducing blade wear.

In order to drive the central blade 14a, I provide another crank 24 on motor shaft 19, which is pinned to a link 26 that is, in turn, pinned to a direction changing lever 27. Lever 27 is suitably pivoted to a bracket as at 28 depending from the vehicle body or cowl. The other end of lever 27 connects to a link 29 which, in turn, is pinned to crank 16a for blade 14a. It will be noted that this structure makes possible a three blade assembly driven by the conventional two blade motor.

The pattern produced by the two 120° sweep blades and the 96° sweep blade approaches maximum cleaning area with minimum net blade sweep, all as will be apparent from examination of Fig. 3.

In reducing my invention to practice, I have installed and tested an assembly fitted to a 1951 Buick 2 door Sedan-Riviera model car. By way of example, but not by limitation, I have found the following basic link dimensions to operate satisfactorily, but, of course, these dimensions are mere guides to those skilled in the art.

Windshield dimensions—15" x 59¾"
Blade length—11½"
Blade arms—10½"
X—20"
Y—18"
Z—5"
Blade pivots—1⅝" below windshield glass
Cranks 16, 16a and 16b—1¾"
Link 17—12¾"
Link 23—24¾"
Distance of attachment of link 17 and crank 18 to motor pivot 19—2⅟₁₆"
Corresponding distance for link 23—1½"
Crank 24—1¾"
Link 26—2¹⁵⁄₁₆"
Lever 27—3½" long, pivoted approximately at its center
Link 29—11½"

I contemplate that in a typical installation, a feature of the invention resides in the employment of a single motor for operating a series of blades that substantially leave no blind spots. It will also be seen that in the preferred embodiment of the invention the pivot shaft at the driver's left side blade is not too far from the left edge of his windscreen, thereby making possible an effective wiper-arc cooperation with the center and off-side blades that augments visibility and reduces proneness to accidents.

Having thus described my invention, I claim:

In a vehicle, a cowl, three shafts pivoted in said cowl, wiper blades mounted on the outer ends of said shafts, cranks keyed to the inner ends of said shafts, a blade driving motor having an oscillating shaft, a double-ended lever keyed to said motor shaft, links connecting the outside blade cranks to one end of said motor lever, a double-ended direction-reversing lever mounted on said cowl, a link connecting one end of said direction-reversing lever to the crank of the middle of said three blades, and a link connecting the other end of said direction-reversing lever to the other end of said double-ended motor lever.

References Cited in the file of this patent
UNITED STATES PATENTS

| | | |
|---|---|---|
| 1,659,219 | Shaw | Feb. 14, 1928 |
| 1,865,158 | Acierno | June 28, 1932 |
| 2,173,447 | Horton | Sept. 19, 1939 |
| 2,691,185 | Oishei | Oct. 12, 1954 |